United States Patent [19]
Waldman

[11] 3,825,687
[45] July 23, 1974

[54] CODING MEANS FOR TELEPHONE ANSWERING DEVICE

[75] Inventor: Herbert H. Waldman, Brooklyn, N.Y.

[73] Assignee: Electrospace Corporation, North Bergen, N.J.

[22] Filed: June 16, 1972

[21] Appl. No.: 263,412

[52] U.S. Cl. .......... 179/6
[51] Int. Cl. .......... H04m 11/00
[58] Field of Search .......... 179/6 R

[56] References Cited

UNITED STATES PATENTS

| | | | |
|---|---|---|---|
| 3,067,289 | 12/1962 | Zimmermann | 179/6 R |
| 3,133,992 | 5/1964 | Dickman | 179/6 R |
| 3,337,690 | 8/1967 | Martin | 179/6 R |
| 3,344,234 | 9/1967 | Salzberg et al. | 179/6 R |
| 3,376,390 | 4/1968 | Hashimoto | 179/6 R |
| 3,433,897 | 3/1969 | Munson | 179/6 R |
| 3,644,675 | 2/1972 | Watlington | 179/6 R |
| 3,692,940 | 9/1972 | Konno et al. | 179/6 R |

*Primary Examiner*—Paul J. Henon
*Assistant Examiner*—Mark Edward Nusbaum
*Attorney, Agent, or Firm*—Friedman & Goodman

[57] ABSTRACT

A coding device for energizing a desired article comprising a stepping member associated with manually movable switching members of a code selection portion of the coding device for determining a code sequence of a sound and silent periods or intervals. A sound sensing portion activates a switch element of the code selection portion when a sound is transmitted thereto, so that the switch element is in a cooperating relationship with one of the switching members when a proper code is received, to provide connection with a closable element. A tone operated portion closes the closable element upon transmission of a tone to complete a circuit only after a proper code has been received. Each completion of the circuit activates the stepping member to move, in sequence after each proper code, until a position for closing another circuit which energizes the desired article is obtained. Preferably, the coding device is for a telephone answering device and is used to activate a play back switching member of a conventional message tape drive apparatus to rewind and play back a recorded message.

12 Claims, 8 Drawing Figures

PATENTED JUL 23 1974

3,825,687

CODING MEANS FOR TELEPHONE ANSWERING DEVICE

BACKGROUND OF THE INVENTION

This invention relates to a coding device for energizing a desired article, and more particularly relates to a coding device for a telephone answering or recording machine to activate a play back switching member of a conventional message tape drive mechanism to rewind and play back a recorded message. One practical application of the present invention is association with a tape recorder embodied in a telephone answering apparatus of the type described in U.S. Pat. Ser. No. 3,501,592 granted to Herbert Waldman on Mar. 17, 1970.

In telephone answering apparatus of the prior art, the ringing of the telephone at the subscriber's station initiates a normal answering cycle during which a prerecorded message is first reproduced over the telephone line, and thereafter a recording device is activated so as to receive a message over the telephone line. In addition, such a prior art device had provision for playing back previously recorded messages over the telephone line in response to a coded signal initiated by the subscriber from a point remote from his telephone station.

However, spurious or random signals having the same frequency as the coded signal may easily trigger the coded signal responsive circuits. Additionally, the coded signal is usually predetermined by the manufacturer and cannot be altered by the subscriber. Therefore, once unauthorized persons have broken down or obtained the coded signal, the subscriber cannot prevent these unauthorized persons from continuously playing back his previously recorded messages unless the subscriber has the coded signal changed by the manufacturer of the telephone answering apparatus.

Another drawback to the telephone answering apparatus of the prior art is the requirement that the subscriber carry a device for producing the coded signal, wherein such coded signal producing device may prove inconvenient or a nuisance for the subscriber to carry around with him at all times, and may easily be lost, stolen, misplaced or forgotten.

SUMMARY OF THE INVENTION

To overcome the disadvantages of the prior art, the present invention comprises a coding device for energizing a desired article. The coding device includes a stepping member provided with a stepping contact movable between a set of connection positions and a last connection position. The set of connection positions are connected to manually movable switching members of a code selection portion of the coding device in determining a code sequence of sound and silent periods or intervals. A sound sensing portion activates another switch member of the code selection portion when a sound is transmitted thereto. The switch member is positioned in a cooperating relationship with each of the manually movable switching members when a proper code is received to provide a series circuit connection with a closable element, this circuit being associated with the stepping member.

A sound operated portion closes the closable element upon transmission of a second sound or tone to complete the circuit only after a proper code has been received, wherein each completion of this circuit activates the stepping member to move the stepping contact in sequence from one connection position to another connection position of the set of connected positions, and to finally move the stepping contact to the last connected position for closing another circuit which in turn energizes the desired article. Preferably, the coding device includes a safety switch which prevents reception of a code once the tone is initially transmitted so that an unauthorized person cannot have two chances at guessing the code. The coding device is intended for a telephone answering device, being used to activate a play back switching member of a conventional message tape drive mechanism to rewind and play back a recorded message.

Accordingly, it is the principle object of the present invention to provide a coding device that overcomes the disadvantages of the prior art.

Another object of the present invention is to provide a coding device that can be used in a telephone answering apparatus to activate a play back switching member of a tape drive mechanism to rewind and play back a recorded message.

yet another object of the present invention is to provide an easily constructed coding device with low-cost circuitry for use in a telephone answering or recording machine which permits connection to conventional telephone circuitry.

A further object of the present invention is to provide a coding device including a safety switch which prevents reception of a code once a tone is initially transmitted so that an unauthorized person cannot have two chances at guessing the code.

A still further object of the present invention is to provide a coding device, wherein the coding sequence of the sound and silent periods or intervals can be manually set by an authorized person or user.

And a still further object of the present invention is to provide a coding device in which the unauthorized person has no way of knowing whether or not he is transmitting the proper coding sequence.

And yet a still further object of the present invention is to provide a coding device which does not require the authorized user to carry a device for producing the coded signal.

An added object of the present invention is to provide a coding device that combines all of the above-mentioned features with extreme economy and reliability.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which.

DESCRIPTION OF THE PREFERRED EMBODIMENT

Figure 1:
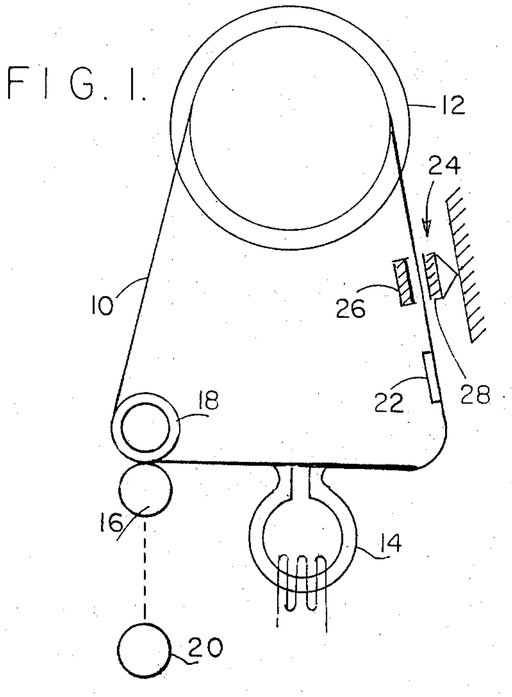
FIG. 1 represents a schematic representation of an announcement tape loop and its drive associated with the present invention.

Referring to the drawings, FIG. 1 shows a schematic representation of announce drive means associated with the telephone answering device of the present invention, similar to the type disclosed in the above cited U.S. Pat. No. 3,501,592, to which reference may be made for a more complete description thereof and for associated elements of the tape recorder of the telephone answering device. The numeral 10 designates a sound-carrier, such as a magnetic tape, and it is in the form of an endless loop, fed from and returned into a cartridge 12 of conventional design. The tape loop 10 includes two channels or tracks, well known in the art. The tape loop 10 is driven past a sound or play head assembly 14 by means of a capstan 16 and pressure roller 18. The capstan 16 is driven in a conventional manner by a motor 20. The play head assembly 14 should be visualized as being equipped with the appropriate circuitry necessary to record and playback intelligence onto and from each of the channels of the tape loop 10. The details of this circuitry are of a conventional design and not essential for an understanding of the present invention, and thus are not shown in the drawings.

A small segment or portion 22 on the endless tape loop 10 is arranged to be electrically conductive. Any suitable and known means may be used to this end, for example, a small piece of metallic foil may be applied to this portion of the tape loop 10. Another example would be to coat the portion 22 with a paint of conductive silver. The conductive portion 22 is designed to engage with an electrical switch post 24 in the course of a cycle of the tape loop 10. The switch post 24, as shown in FIG. 1, includes two conductive sections defining foil sensing contact members 26 and 28, each of which is insulated from each other. As the conductive portion 22 passes the switch post 24, the conductive portion 22 bridges contact member 26 to contact member 28 to activate one of the circuits of the present invention, both contact members 26 and 28 also being shown in the circuit of FIG. 6, the function of which will be set forth hereinafter below in more detail.

Figure 2:
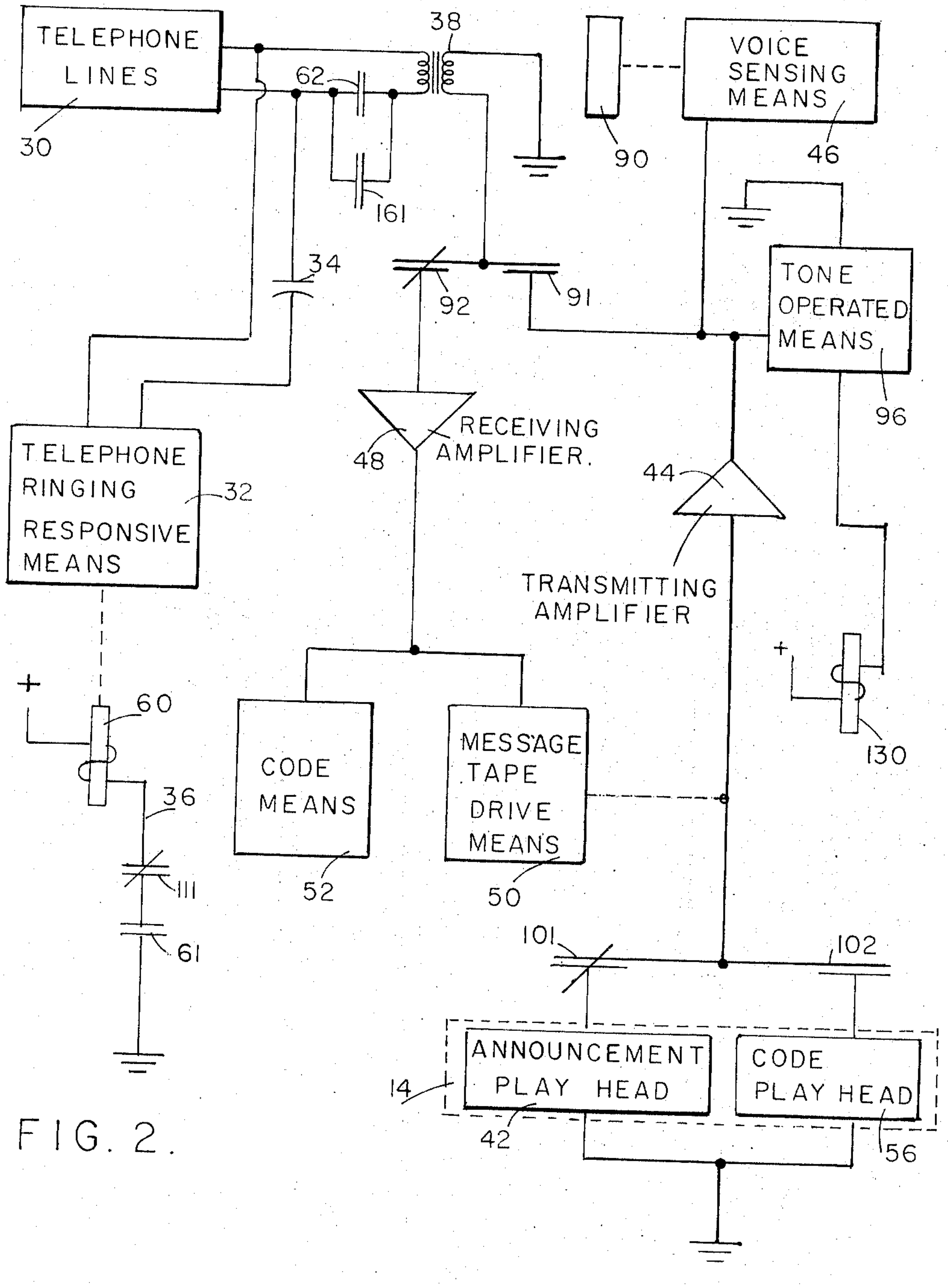
FIG. 2 is a schematic diagram, partially in block form, illustrating parts and circuitry of the present invention, showing the present invention connected to conventional telephone lines.

As shown in FIG. 2, the telephone lines 30 are connected to telephone ringing responsive means 32 of the telephone answering device. This circuit further includes a conventional D.C. blocking capacitor 34 in series with the ringing responsive means 32, functioning in a well understood manner to block the telephone line direct current from the telephone ringing responsive means 32. Upon receipt of a telephone ringing signal, the responsive means 32 activates a relay 60 of the telephone answering device. Relay 60 closes the n.o. (normally opened) switch 61 which is in series with the n.c. (normally closed) switch 111, so that the relay 60 is locked in and remains activated as long as there is no break in the line 36 from the positive to ground terminals.

The relay 60 also closes the n.o. switch 62 so that the telephone lines 30 are connected to a transformer 38. This connection effectively seizes the telephone lines 30 in the same manner as lifting the conventional receiver of the telephone, not shown, at which time the ringing signal of the telephone ceases and the telephone is in condition to receive and transmit communications therethrough, the relay 60 still being activated as set forth above.

Figure 3:
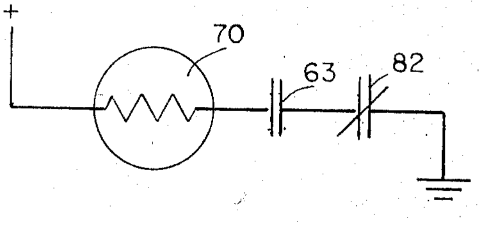
FIG. 3 illustrates a time delay element of the present invention.

In operation, once the telephone has been answered, a conventional time delay element 70, as shown in FIG. 3, will become activated in approximately three seconds after the closing of the n.o. switch 63, the switch 63 being closed by the relay 60 upon activation. As shown, one lead of the time delay element 70 is connected to the positive terminal, wherein the other lead of the time delay element 70 is connected in series with the n.o. switch 63 and the n.c. switch 82 to the ground terminal.

Figure 4:
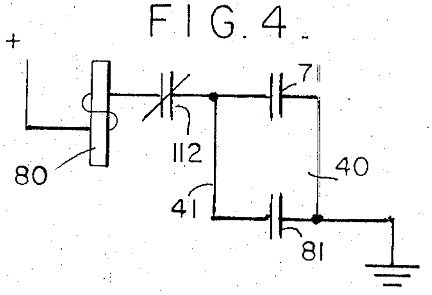
FIG. 4 illustrates a relay circuit of the present invention associated with the time delay element of FIG. 3.
Figure 5:
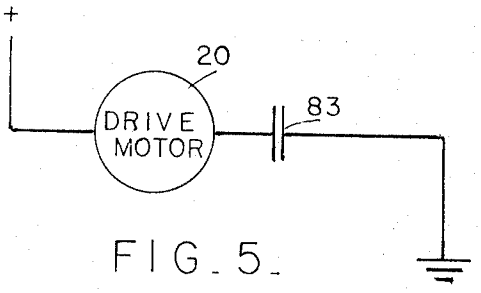
FIG. 5 illustrates a drive motor circuit of the present invention controlled by the relay circuit of FIG. 4.

The element 70, once activated, closes the n.o. switch 71, shown in FIG. 4, to energize the relay 80. The relay 80 as shown, is associated with line 40 which includes the n.o. switch 71, and line 41 which includes the n.o. switch 81. Each of the lines 40 and 41 is in series with the ground terminal and the n.c. switch 112 which is connected to the positive terminal. Accordingly, as the relay 80 is activated, the n.o. switch 81 is closed to further maintain the relay 80 in the activated condition, and additionally, the n.c. switch 82 of FIG. 3 is opened, thereby deactivating element 70 which in turn opens the n.o. switch 71 of line 40. However, as stated above, the relay 80 is still energized due to the closure of the n.o. switch 81 of line 41. Furthermore, the activated relay 80 closes the n.o. switch 83 which is in series with the drive motor 20, as shown in FIG. 5, thereby completing the circuit from the positive terminal to the ground terminal to start the drive motor 20 and therefore the driving of the tape loop 10.

As shown in FIG. 2, the play head assembly 14 includes an announcement play head 42 and a code play head 56. If the caller has made no sound during the period of time before the delay element 70 is activated, the announcement play head 42 once the tape loop 10 is in motion will transmit a preselected message from one of the two channels of tape loop 10 through the n.c. switch 101 to the transmitting amplifier 44, this channel being designated the announcement channel. At this moment, the announcement or message will be detected by conventional voice sensing means 46, which in turn activates a muting relay 90 to close n.o. switch 91 and to open n.c. switch 92, so that the announcement or message is transmitted through the now closed n.o. switch 91 to the transformer 38, and from the transformer 38 through the closed n.o. switch 62 to the telephone lines 30. The conventional voice sensing means 46 is shown, for example, in U.S. Pat. No. 2,946,852 issued to W. J. Brown et al. on July 26, 1960, and is also shown, for example, in FIGS. 2A and 3A of U.S. Pat. No. 3,433,897 issued to V. E. Munson on March 18, 1969, as set forth therein. The muting relay 90 is shown, for example, in FIG. 4 of U.S. Pat. No. 3,133,992 issued to M. C. Dickman on May 19, 1964, being set forth in lines 50–66 of column 10 thereof, and also, for example, a circuit including two direct-coupled audio stages having muting is shown in J. S. Hill, A Compact 40 Meter transceiver, CQ, June 1966, pages 22–27. The muting relay 90 insures that there is no transmission from the transmitting amplifier 44 to the receiving amplifier 48.

After the announcement or message is completed, the muting relay 90 is deactivated by the silence on the announcement channel so that the switch 91 is again opened and switch 92 is again closed. Information can now be received from the telephone caller through the receiver amplifier 48 to conventional message tape drive means 50 for recording thereof, wherein the drive means 50 are activated by a signal from the announcement channel of the tape loop 10, the drive means 50 and activating signal being well known in the art and need not be described herein for an understanding of the present invention. It should be pointed out at this time, that the information cannot be transmitted to the transmitting amplifier 44, but will also be transmitted from the receiver amplifier 48 to the code means 52. However, even though the code means 52 is activated at this time, it will have no effect on the recording of the information by message tape drive means 50, wherein further details will be set forth hereinafter below, during the discussion of the code means 52 for a better understanding thereof.

Figure 6:
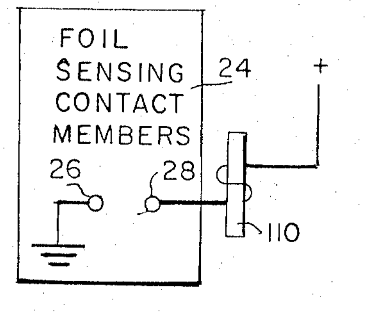
FIG. 6 illustrates a circuit containing the foil sensing contact members shown in FIG. 1.

After sufficient time, while the drive motor 20 is still functioning to move the tape loop 10, the conductive portion 22 is brought into contact with the switch post 24. When the conductive portion 22 completes the connection between contact members 26 and 28, the relay 110 as shown in FIG. 6 is activated. The relay 110 opens the n.c. switch 111, as shown in FIG. 2, to deactivate the relay 60. The deactivation of the relay 60 in turn opens the n.o. switch 61 and the n.o. switch 62 which effectively acts in the same manner as hanging up the receiver of a conventional telephone once a call is completed.

At the same time, the drive means 50 are deactivated by conventional means to stop the recording of the information, such as by activation of relay 110, wherein the drive means 50 would be provided with an associated switch, not shown, such being well known in the art. Additionally, the activation of relay 110 functions to open n.c. switch 112, as shown in FIG. 4, so that the relay 80 is deactivated. The deactivation of relay 80 functions to open n.o. switch 83 of FIG. 5 so that the drive motor 20 stops. It may be pointed out that by conventional means or by the inertia of the moving tape loop, the conductive portion 22 is moved out of contact with the contact members 26 and 28 after the drive motor 20 stops, so that the relay 110 is deactivated and therefore the n.c. switch 111 of FIG. 2 and n.c. switch 112 of FIG. 4 are again in the closed position. Accordingly, the telephone answering device is now in proper position to repeat the above operations when the next call is received.

An mentioned above, time delay element 70 delays the start of the drive motor 20 when the telephone is initially answered. If during this delayed period the caller makes a sound, such as "coding please," right after the telephone is answered, the sound would be received by the receiving amplifier 48 through the n.c. switch 92 and will be transmitted to the code menas 52, the code means 52 being best shown in FIG. 7. It should be noted at this point that the sound is also transmitted to the message tape drive means 50, but since the drive means 50 have not been activated, the sound is not recorded.

The code means 52 includes a voice sensing means 54 connected in series with a n.c. switch 132, the function of which will be set forth in more detail hereinafter below. The voice sensing means 54, as voice sensing means 46, is shown for example in the above mentioned U.S. Pat. No. 2,946,852 and No. 3,433,897. The transmitted sound activates the voice sensing means 54 to complete the circuit from positive to ground terminals which in turn activates the relay 120. The relay 120 closes the n.o. contact 124. Therefore, another circuit from positive to ground terminals is completed through the now closed n.o. switch 124 and n.c. switches 142 and 103. At the same time, the relay 120 closes the n.o. switch 125 so that the coding relay 100 is activated by completing the circuit from positive to ground terminals through the n.c. switch 113. The code relay 100 closes the n.o. switch 104 and opens the n.c. switch 103 so that the code relay 100 locks itself in, bypassing the switch 125 so that the coding relay 100 will remain activated for the remainder of the playing of the tape loop 10, and will not be deactivated until the n.c. switch 113 is opened by the relay 110, shown in FIG. 6, when the contact members 26 and 28 are closed in the same manner as set forth hereinbefore above. The opened n.c. switch 103 will cause the relay 120 to deactivate once the caller is silent, wherein the n.o. switches 124 and 125 will open.

Figure 7:
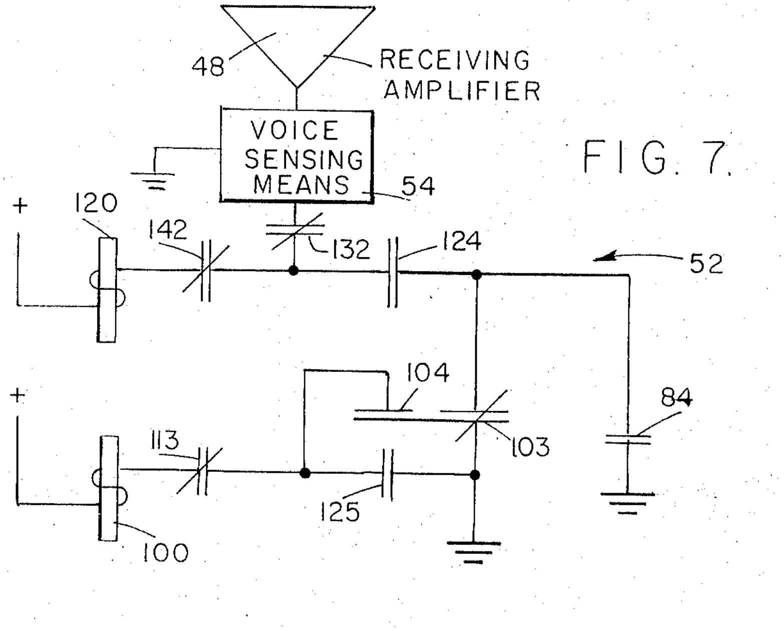
FIG. 7 illustrates the circuitry of the code means shown in FIG. 2.

After the delay time period during which the sound was transmitted, the relay 80 shown in FIG. 4 will be activated in the same manner as mentioned above, wherein the drive motor 20 will be started, and additionally the n.o. switch 84 shown in FIG. 7 is activated by the relay 80. Accordingly, by the closure of n.o. switch 84 and the n.c. switch 142, another circuit from the positive to ground terminals is presented so that the relay 120 will remain in an activated position when the n.o. switch 124 is again closed through the activation of relay 120 by the voice sensing means 54.

Additionally, the coding relay 100 opens the n.c. switch 101 shown in FIG. 2 and closes the n.o. switch 102 so that the second or coding channel on the tape loop 10 is transmitted by the code play head 56 when the drive motor 20 is started. Preferably, the second channel will transmit a number or sound, remain silent for a selected time period, and then transmit a tone. After the tone, a second number or sound will be transmitted followed by another period of silence and then another tone, this procedure defining the coding sequence. Preferably, there will be five numbers or sounds followed by five periods of silence, and then followed by five tones on the coding channel. The caller must either make a sound or remain silent during these above-mentioned periods of silence in order to obtain the correct coding as will be set forth in more detail hereinafter below. It is further desired that the information on the announcement channel have a longer playing time then the code information on the coding channel so that the coding channel is silent when the announcement information is completed, the reason for which will also be set forth hereinafter below.

Figure 8:
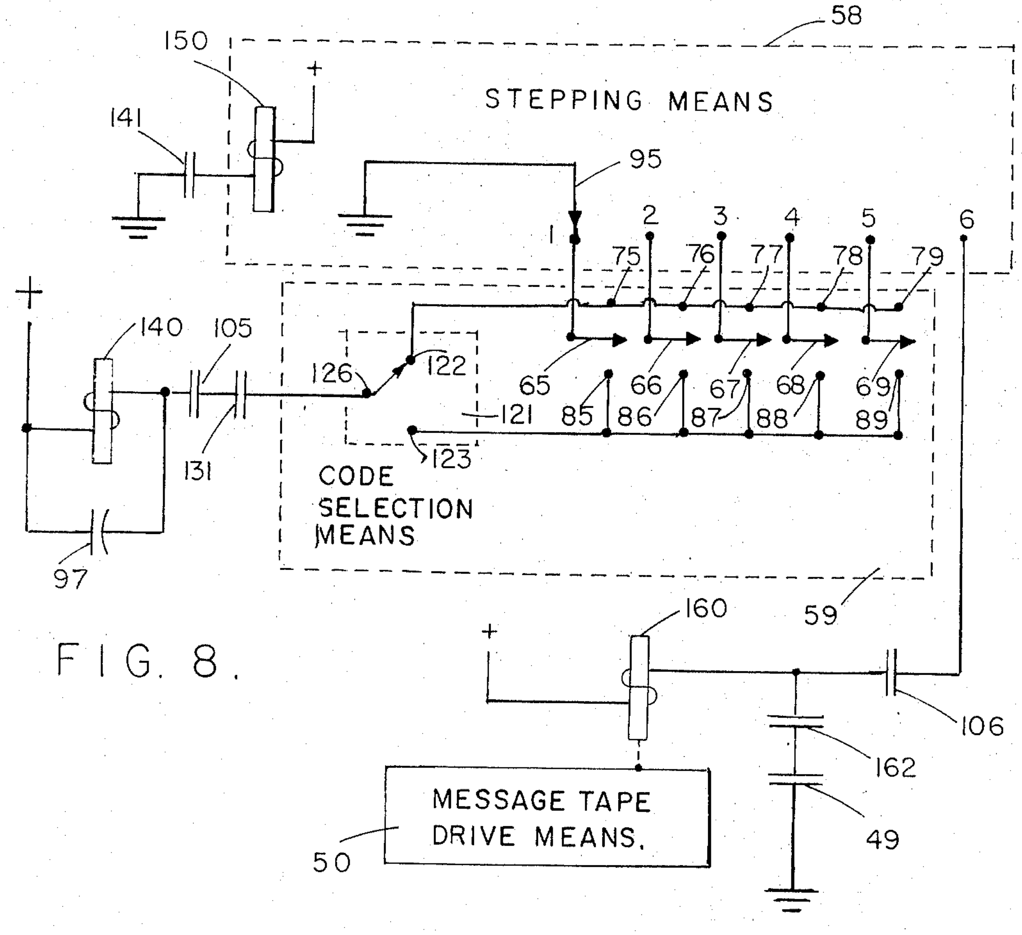
FIG. 8 illustrates the circuitry of the stepping means and the code selection means of the present invention.

FIG. 8 discloses the advancing or stepping means 58 associated with code selection means 59, where it is noted that the stepping means may be, if preferred, a commercially available electronic stepper, such as a "ring counter." The user of the present invention determines the coding sequence wherein the switches 65, 66, 67, 68 and 69 can individually be manually moved to either the "silent" positions (or contacts) 75, 76, 77, 78 and 79 or the "talk" (or "sound") positions (or contacts) 85, 86, 87, 88 and 89. Any sequence may be selected by the user. Additionally, the code selection means include a switch 121, controlled by the relay 120, connected to the silent and talk positions of the code selection means 59. Post 122 of switch 121 is connected in series with the silent positions, 75–79, and post 123 of switch 121 is connected to the talk or sound positions 85–89. When the relay 120 is not activated, common post 126 of switch 121 is connected to the post 122. When the relay 120 is activated, the common post 126 is then connected to the post 123.

The switches 65-69 are connected in series to stepping posts 1–5 of the stepping means 58, respectively, as shown in FIG. 8. A conventional stepping contact 95 is connected to ground. Initially, when a call is first received, the stepping contact 95 is in contact with the stepping post 1 so that switch 65 is connected to ground. If the user has selected "silence" after the first announcement number, then the switch 65 will be connected to silent contact 75 which in turn will be connected to the post 122. As mentioned above, common post 126 will be connected to the post 122 because the relay 120 is in a deactivated condition at this particular time prior to an outside call on the telephone.

After the telephone is initially answered and the caller has stated "coding please" or the like, channel two of the tape loop 10 will transmit a number such as "one" or sound once the drive motor 20 has been started in the same manner stated above. After hearing the number or sound, the caller for correct coding will remain silent in this particular case. After a silence period of approximately two or three seconds, a predetermined tone will be transmitted from the tape. This tone will activate the tone operated means 96, shown in FIG. 2, which in turn will activate the tone relay 130. The tone operated means 96 is shown for example in FIG. 6 of U.S. Pat. No. 3,501,592 issued to Herbert Waldman on Mar. 17, 1970 as the circuit for the operation of K3 T.O.R. relay, and also shown for example in FIG. 3 of U.S. Pat. No. 3,508,004 issued to Herbert Waldman on Apr. 21, 1970 as any one of D.S. tank circuit 12, T.G. tank circuit 20 and T.R. tank circuit 44. The tone relay 130 will cause the n.o. switch 131 shown in FIG. 8 to close wherein the n.o. switch 105 has already been closed by the relay 100, of FIG. 7, as stated above. Accordingly, the circuit containing the slave relay 140 is now complete from the ground terminal, to the stepping contact 95, through the stepping post 1, to the switch 65, to the contact 75, to the post 122, to the common post 126, through the n.o. switch 131, through the n.o. switch 105, and finally to the positive terminal, thereby energizing the slave relay 140. The slave relay 140 closes the n.o. switch 141 to energize the conventional stepping relay 150. The stepping relay 150 will cause the stepping contact 95 to move from stepping post 1 to stepping post 2 by well known conventional means once the stepping relay 150 is deenergized, which is effected by the opening of switch 141.

When the stepping relay 150 is initially energized, the stepping contact 95 would normally move slightly away from the stepping post 1, so that the circuit energizing the relay 140 would open because stepping post 1 is no longer connected to the ground terminal, whereby the deenergizing of the relay 140 would cause the n.o. switch 141 to open. The abrupt opening of the n.o. switch 141 would result in too short or an insufficient pulse duration having been delivered to the stepping relay 150 so that the stepping contact 95 would not be moved from stepping post 1 to stepping post 2, whereby the stepping contact 95 would continue to make and break contact with the stepping post 1, resulting in a chattering effect.

To avoid this chattering effect, a conventional capacitor 97 is connected in parallel with the slave relay 140. The capacitor 97 preferably has a value of approximately 500 micro-farads, which delays the deenergizing of the slave relay 140. This effects a slow release of the n.o. switch 141 providing a longer energizing pulse duration delivered by the n.o. switch 141 so that the contact 95 can move a sufficient distance from stepping post 1 when the relay 150 is energized to avoid the above mentioned chattering effect. The stepping contact 95 is now in proper position to move to the stepping post 2 after the stepping relay 150 is deenergized upon the opening of the n.o. switch 141.

It should be noted at this point, that if the caller does not known the code sequence, and talks or makes a sound during the period that he should be silent, his sound will be picked up by the voice sensing means 54 which would energize the relay 120 of FIG. 7, as mentioned above. Therefore, the switch 121 of FIG. 8 will be energized and the connection between posts 122 and 126 will be open with the connection now being closed between post 123 and 126, thereby providing an open circuit where the ground terminal is connected to the silent contact 75 and the post 122. Accordingly, the slave relay 140 cannot be energized when the tone is transmitted, nor can the stepping relay 150 be energized so that the stepping contact 95 will not be moved to stepping post 2. Furthermore, the relay 120 will remain energized until the switch 84 is opened at the end of the tape loop 10 cycle, thereby maintaining the connection between posts 123 and 126. This will result in the stepping contact 95 always being positioned at stepping post 1 during this telephone call no matter what means the caller uses in an attempt to rectify his mistake because the post 126 remains in contact with the post 123 while the ground terminal at the stepping contact 95 is connected by the contacts 75 and 65 to the post 122 but not to the post 123, so that the circuit between the positive and ground terminals cannot be completed across the slave relay 140.

The tone relay 130 also serves to open the n.c. switch 132 in FIG. 7 once the tone is initially transmitted. in this way, a caller who does not know the code sequence cannot remain silent until he hears the tone, and then make a sound in an attempt to activate the system. The switch 132 functions in a similar manner as the switches 91, 92 controlled by the muting relay 90 to prevent the above situation which would be possible without these safety devices. However, there are many instances where there would be no need for the muting relay 90 and switches 91 and 92, so that switch 132 would be effective by itself to prevent an unauthorized caller from using the above procedure.

It may be pointed out at this time that instead of a voice announcing numbers, the tape loop can employ sound beeps to signify the respective numbers, wherein the voice sensing means 54 could be provided with bypass filters which would not transmit these sound beeps. With this construction utilizing the sound beeps and bypassed filters, there would be no need for the relay 90 and the switches 91 and 92 as used in the present invention, only the safety switch 132 would be needed to prevent the above procedure by the unauthorized caller.

By way of example, let us assume that the user has preselected a talk or voice position after the second announced number. The stepping contact 95 is now connected to stepping post 2, and switch 66 is manually set at sound position 86 which is connected in series to post 123, as shown in FIG. 8. After the second announced number, the caller for correct coding sequence will then repeat the number or make any other sound. As stated above, this sound will be picked up by the voice sensing means 54 which will energize the relay 120 of FIG. 7. Accordingly, the switch 121 of FIG. 8 will be energized and the connection between post 123 and 126 will be closed, thereby connecting the ground terminal to post 126. When the tone is transmitted, n.o. switch 131 will again close as mentioned above, and the slave relay 140 will be energized to effectively energize the stepping relay 150 and cause the stepping contact to move from stepping post 2 to stepping post 3, in the same manner as stated above. The energizing of slave relay 140 additionally causes the n.c. switch 142, shown in FIG. 7, to open, thereby deenergizing relay 120 which causes the connection between posts 126 and 123 of switch 121 to be opened, thereby closing the connection between posts 126 and 122 so that the switch 121 is in position for the next code.

If the unauthorized caller had guessed correctly on the first code, and incorrectly guesses that the second code is silence, the stepping contact 95 will not move to the next stepping post 3. This is because the posts 122 and 126 of switch 121 will remain in a connected position and the silent contact 76 will not be in contact with ground, while the switch 66 which is connected to the ground terminal, is in connecting relationship with the sound position 86. Therefore, the slave relay 140 will not be energized, nor will the stepping relay 150 be energized. This effectively loses one tone, wherein as shown in the present embodiment, there are five tones required to move the stepping contact 95 to stepping post 6. Therefore, because of this lost tune, the unauthorized caller can never reach stepping post 6 with the three remaining tones.

The above-mentioned sequence is repeated until the stepping contact 95 makes contact or connection with the stepping post 6. At this point, the relay 160 is activated by the circuitry from ground, to stepping contact 95, to stepping post 6, through n.o. contact 106 which has already been closed by activation of relay 100 shown in FIG. 7, to the positive terminal. The relay 160 may close many different switches to activate different desired devices such as lights, television sets, alarm systems, etc. In the present embodiment, the relay 160 activates conventional play back switching means (not shown) of the message tape drive means 50 to rewind and play back the recorded messages to the caller, such conventional play back switching means being more fully described in U.S. Pat. Ser. No. 3,508,004 granted to the applicant on Apr. 21, 1970.

The message tape drive means 50 closes a n.o. switch 49 which is in series with a n.o. switch 162 which has been closed by relay 160. Accordingly, the switches 49 and 162 will lock in the relay 160 until the message tape (not shown) has completed transmitting its play back information to the caller who has presented a proper code. Accitionally, the relay 160 will close a n.o. switch 161, which is in parallel arrangement with the n.o. switch 62 as shown in FIG. 2, to hold the telephone lines in an operative condition until said message tape is finished, as set forth below.

During the above latter time period, while the message tape is being played back, the conductive portion 22 on the tape loop 10 will come in contact with the contact members 26 and 28, shown in FIGS. 1 and 6, to energize the relay 110 as set forth above. Relay 110 will open the n.c. switch 113 of FIG. 7 and thus deenergize the relay 100, which in turn will open the n.o. switch 106 of FIG. 8. The opening of the above n.o. switch 106 breaks or opens the connection between the stepping contact 95 connected to the ground terminal and the positive terminal. Well known conventional means (not shown) move the stepping contact 95 back to post 1 upon the activation of the relay 110, such arrangement being well known in the art. Additionally, n.c. switch 111 of FIG. 2 is opened by the activation of the relay 110, thereby deactivating the relay 60 which opens the n.o. switch 62. However, as stated above, the n.o. switch 161 is still closed so that the telephone lines are still connected in an operative condition even though the parallel n.o. switch 62 is open.

Once the message tape has completed transmitting its play back information, the conventional play back switching means are deactivated by well known signal means such as a recorded index tone as set forth in the above cited U.S. Pat. No. 3,508,004. The n.o. switch 49 is now opened by the deactivated message tape drive means 50 to effect deactivation of the relay 160. When the relay 160 is deactivated, the n.o. switch 162 of FIG. 8 will open in addition to the opening of the n.o. switch 161 of FIG. 2 which will effectively act in the same manner as hanging up the receiver of a conventional telephone once a call is completed. Therefore the mechanism is now in its original position as before the call came in, and is again ready to receive another telephone call.

As stated above, the code means 52 will be activated when the caller is transmitting information to the message tape drive means 50 for recording thereof, such having no effect even though both relay 120 and coding relay 100 are locked in, in the manner set forth above. At this point, the announcement has already been made so that the opening of the n.c. switch 101 and the closing of the n.o. switch 102 of FIG. 2 has no effect on the recording wherein the tape loop 10 is silent for its remaining portion on both the announcement and coding channels, as stated above. Therefore, there is no tone to activate the stepping means 58 so that relay 160 cannot be activated to effect the drive means 50. At the end of the message time of tape loop 10, the conductive portion 22 will cause the relay 110 of FIG. 6 to open the n.c. switch 113 of FIG. 2 to deactivate the coding relay 110, and to open the n.c. switch 112 of FIG. 4 to deactivate the relay 80 which will open the n.o. switch 84 so that the relay 120 of FIG. 7 is deactivated. Accordingly, the code means 52 is now in proper position for the next call, wherein the telephone lines 30 are disconnected as set forth above.

It should be noted that with the present invention, the unauthorized caller who starts the coding sequence by making a sound when the telephone is first answered before the delay element 70 is activated, has no way of knowing whether or not he is giving the proper coding sequence. This unauthorized person will hear the complete coding tape channel whether or not his responses thereto are proper, as set forth above. In this way, the unauthorized caller cannot easily determine the correct coding sequence by trial and error, whereby every one of the possible coding combinations may have to be made in order to obtain the correct coding sequence. As mentioned above, the coding sequence is manually determined by the user, therefore the user can change the coding sequence as often as he desires at any time to hinder the unauthorized caller.

Numerous alterations to the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A coding device for energizing a desired article comprising advancing means including at least first and last connection positions for moving in sequence from said first connection position to another connection position until said last connection position is reached, code selection means connected to said advancing means, said code selection means determining a code sequence defined by sound and silent intervals, said code selection means including manually movable switching members cooperating with silent code contacts and sound code contacts, each manually movable switching member being individually movable between an associate silent code contact and an associate sound code contact for determining a code, each silent code contact being connected to said silent code position of said code selection means, and each sound code contact being connected to said sound code position of said code selection means, sound sensing means operatively associated with said code selection means for changing said code selection means from a silent code position to a sound code position when a sound is transmitted to said sound sensing means, tone producing means operatively associated with said code selection means for providing a tone after each one of said sound and silent intervals, a closable element connected to said code selection means, tone operated means for closing said closable element upon transmission of said tone for completing a first electrical circuit from said advancing means through said code selection means to said closable element, said first circuit being energized only after a proper code has been administered to said coding device, each energizing of said first circuit activating said advancing means to move in said sequence to the next connection position, said last connection being disposed in a second electrical circuit for energizing the desired article, said second circuit being energized when said last connection position is reached.

2. A coding device according to claim 1, wherein said advancing means includes a set of connection positions including said first connection position, and a stepping contact movable between said set of connection positions and said last connection position, each connection position of said set of connection positions being connected to an associate manually movable switching member of said code selection means.

3. A coding device according to claim 1 including safety switch means to prevent reception of a sound code when said tone is being transmitted so that an unauthorized person cannot have two chances at guessing the proper code, said safety switch means being activated by said tone operated means.

4. A coding device according to claim 1, wherein said first circuit includes slave relay means for activating said advancing means and a capacitor connected in parallel with said slave relay means to delay deenergizing of said slave relay means for avoiding a chattering effect in said advancing means

5. A coding device according to claim 4, wherein said slave relay means de-activates said sound sensing means for releasing said code selection means from said sound code position back to said silent code position.

6. A coding device according to claim 5, wherein said sound sensing means includes relay means for changing said code selection means from said silent code position to said sound code position, said slave relay means de-activating said sound sensing relay means for releasing said code selection means, whereby said code selection means will remain in said sound code position when an incorrect sound code is transmitted to said sound sensing means and thus said first circuit including said slave relay means will not be energized so that said last connection of said advancing means cannot be reached to energize the desired article.

7. A coding device according to claim 1 in combination with a telephone answering device, means for operatively associating said telephone answering device with said coding device, said coding device including telephone ringing responsive means for connecting said coding device to telephone lines upon receipt of a telephone ringing signal, said coding device being provided with time delay means for delaying start of said telephone answering device a predetermined interval after said coding device is connected to the telephone lines.

8. A coding device according to claim 1 in combination with a recording device, means for operatively associating said recording device with said coding device, said coding device including second sound sensing means to prevent reception of sound to said coding device when said recording device is transmitting a sound.

9. A coding device according to claim 1 in combination with a recording device, means for operatively associating said recording device with said coding device, said recording device including an announcement play head circuit and a code play head circuit, and relay means for opening said announcement play head circuit and closing said code play head circuit when an initial sound is first transmitted to said coding device.

10. A coding device according to claim 1 in combination with a recording device, means for operatively associating said recording device with said coding device, said recording device including a sound carrier provided with a coding channel for transmitting a coding sequence for defining said tone producing means, said coding sequence including a number of consecutive code sets, each code set including an associated preselected sound followed by a period of silence and terminating with said tone for activating said tone operated means.

11. A coding device according to claim 10, wherein said sound carrier is further provided with an announcement channel, and means for selecting said coding channel for transmission when an initial sound is first transmitted to said coding device.

12. A coding device according to claim 10, wherein said advancing means includes one connection position more than said number of said code sets to provide a sufficient amount of said tones to reach said last connection with a proper code and to prevent said last connection from being reached if at least one improper silent code is administered, whereby said improper silent code causes one of said tones to be ineffective for completing said first circuit so that said advancing means is not moved to another connection position and there are not enough remaining tones to reach said last connection.

* * * * *